United States Patent [19]

Lo et al.

[11] 4,059,354

[45] Nov. 22, 1977

[54] STEREOSCOPIC PHOTOGRAPH COMPOSITION APPARATUS

[75] Inventors: Allen Kwok Wah Lo; Jerry Curtis Nims, both of Dunwoody, Ga.

[73] Assignee: Dimensional Development Corporation, Atlanta, Ga.

[21] Appl. No.: 731,517

[22] Filed: Oct. 12, 1976

[51] Int. Cl.² .................. G03B 27/32; G03B 35/14
[52] U.S. Cl. ................................... 355/22; 354/115; 355/46
[58] Field of Search ................ 355/22, 46; 354/114, 354/115

[56] References Cited

U.S. PATENT DOCUMENTS

| | | | |
|---|---|---|---|
| 3,895,867 | 7/1975 | Lo et al. | 355/22 X |
| 3,953,869 | 4/1976 | Lo et al. | 354/115 |

*Primary Examiner*—Richard A. Wintercorn
*Attorney, Agent, or Firm*—Brumbaugh, Graves, Donohue & Raymond

[57] ABSTRACT

An apparatus for composing stereoscopic photographs uses a two-stage optical enlarging system. The two-stage system enables one step composing of a stereoscopic photograph without spacial separation or movement of the two-dimensional views from which the photograph is composed.

8 Claims, 2 Drawing Figures

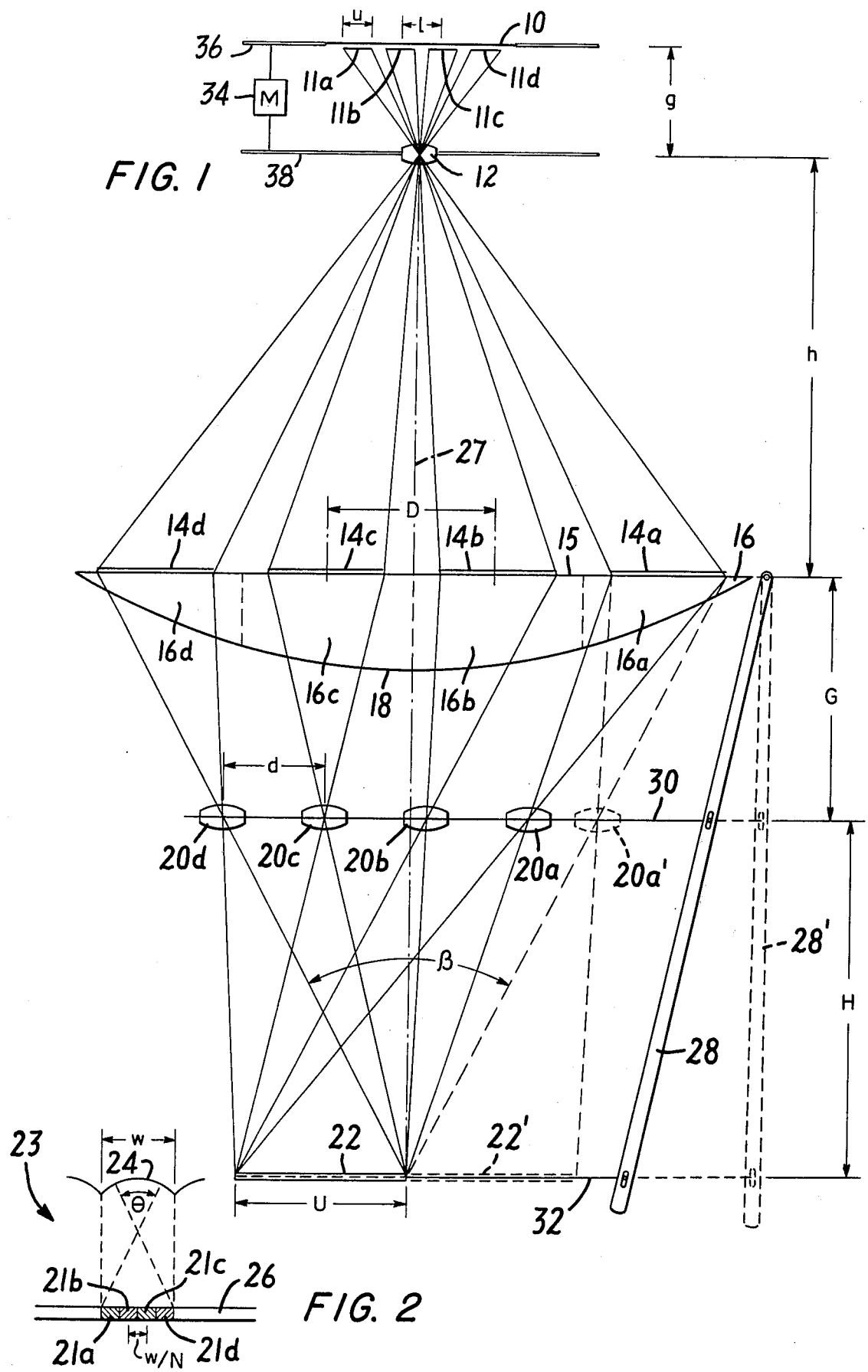

STEREOSCOPIC PHOTOGRAPH COMPOSITION APPARATUS

BACKGROUND OF THE INVENTION

This invention relates to composing stereoscopic photographs and particularly to composing apparatus wherein multiple two-dimensional views of an object field are projected onto a photosensitive surface through a lenticular screen.

Our U.S. Pat. No. 3,953,869, issued Apr. 27, 1976, discloses methods and apparatus for producing stereoscopic photographs. In one form of apparatus there disclosed, stereoscopic photographs are produced using a multi-lens camera which simultaneously takes a plurality of two-dimensional views of an object field, each view from a different horizontal vantage point. The images taken by the camera are located side-by-side on a film strip with the spacing between adjacent views determined by the center-to-center spacing of the camera lenses. A stereoscopic photograph is produced from these adjacent two-dimensional views by projecting the images onto a photosensitive print film over which is placed a lenticular screen. To achieve proper stereoscopic or three-dimensional image appearance, the image on each of the two-dimensional views of a selected object in the object field is projected in registry with a reference point. The selected object will thus appear to lie in the plane of the stereoscopic photograph, while objects closer to the camera than the selected object will appear to project from the photograph and objects located farther from the camera than the selected object will appear to recede into the photograph.

In accordance with U.S. Pat. No. 3,953,869, for proper image composition in the stereoscopic photograph the two-dimensional views and projection lenses are so arranged relative to the lenticular screen that the condensed images formed therefrom beneath each lenticule of the screen are equidistantly and symmetrically spaced across the width of the lenticule; see FIG. 3 of the patent. Moreover, for optimum image quality in the final picture, the overall angle at which the two-dimensional views are projected onto the lenticular screen should substantially equal the viewing or acceptance angle of the lenticular screen. It is not practical in certain applications, however, such as in the case of snapshot cameras, for example, to utilize a two-dimensional film strip of sufficient length to allow the foregoing composing conditions to be achieved without unduly enlarging the size of the camera.

U.S. Pat. No. 3,953,869 discloses alternate techniques for overcoming this problem and achieving the required projection lens spacing and projection angle in the composing step. According to one such technique, the two-dimensional film strip is cut and the individual views, together with the associated projection lenses, are physically separated by the required distance. Another technique is to project the two-dimensional views sequentially, i.e., one at a time, and move the film strip between projections of successive two-dimensional views.

Although these composing techniques are useful for certain applications, it is desirable in other applications, particularly where composing speed is important or where large numbers of film strips are to be handled, to avoid the necessity of cutting the film strip and separately locating the individual two-dimensional views and projection lenses in the proper projecting positions. For like reasons, it is desirable to avoid the repeated movement and projection of the film strip required in the sequential composing technique.

As is further disclosed in U.S. Pat. No. 3,953,869, adjustments are required either in the camera or the composing apparatus whenever there is a change in the distance from the camera to the selected object, designated the "key subject matter" in the patent, if optimum image quality is to be obtained in stereoscopic photographs. The patent discloses cameras having structure for accomplishing such adjustments within the cameras themselves, thereby allowing the composing apparatus to be fixed. In order to minimize camera complexity and cost, however, it is desirable that the adjustments be carried on in the composing apparatus. This is especially true for snapshot cameras and the like, where the cameras must be at once easy to handle and use and inexpensive.

SUMMARY OF THE INVENTION

It is therefore an object of the present invention to provide a new and improved apparatus for composing stereoscopic photographs.

It is a further object of the present invention to provide an apparatus for composing such photographs wherein multiple two-dimensional views on a film strip need not be mechanically separated or relocated during the composing process.

It is another object of the invention to provide apparatus for composing stereoscopic photographs which permits of rapid and simplified adjustment for variations in the distance from the camera to the object of the photographic scene that is to lie in the plane of the stereoscopic photograph.

The foregoing and other objects of the invention are attained, in accordance with the invention, by the provision of apparatus for composing a stereoscopic photograph from a plurality N of adjacent two-dimensional views of an object field, such views having been taken at spaced vantage points relative to the field, by (1) enlarging the adjacent two-dimensional views to form a corresponding plurality N of adjacent enlarged two-dimensional images of the views and (2) projecting the enlarged images through a corresponding plurality N of projecting lenses and onto a lenticular print film. The image from each view of a selected object in the object field is projected in substantial registry with a reference point. The N enlarged two-dimensional images are spaced apart by a distance D which is related to the spacing $d$ between the N projecting lenses such that the N condensed images of the N projected two-dimensional images formed on the lenticular print film beneath each lenticule thereof are spaced apart by substantially $W/N$, where $w$ is the lenticule width. By virtue of such apparatus, stereoscopic photographs may be composed from plural two-dimensional views in a one-step high speed operation, and without necessitating individual or repeated adjustment of the two-dimensional views or associated projection lenses. Such apparatus has particular application to the production of snapshots and like photographs, where the two-dimensional views are taken with a single camera and formed on a film strip. In accordance with the invention, such film strip may be utilized in tact and composed directly into a stereoscopic photograph in an essentially one-step operation.

In a preferred embodiment, the apparatus includes a field lens or lenses for imaging the enlarged two-dimensional images on the projecting lenses. The field lens may be of any suitable configuration, such as a plano-convex lens or a double convex lens, and may comprise a single large lens or a number of smaller lenses, e.g., one for each of the projecting lenses. The apparatus also preferably includes provision for varying the angle of projection of the two-dimensional views during projection to provide an overall projection angle β which substantially matches the viewing angle θ of the lenticular print film.

According to another feature of the invention, the effect on the required arrangement of components in the composing apparatus of variation in the spacing between the images of the selected object on adjacent two-dimensional views which occurs when the distance from the camera to the selected object changes is taken into account by adjusting the magnification given to the two-dimensional views in the primary composing stage. In this way, the enlarged images of the two-dimensional views produced in the primary stage are properly spaced apart for correct projection of the selected object images thereon, by the secondary projection lenses, in registry with the predetermined reference point. Adjustment of the composing apparatus for variation in the photographic distance is thereby readily and economically accomplished, while at the same time permitting the use of simplified, low cost cameras.

BRIEF DESCRIPTION OF THE DRAWINGS

FIG. 1 is a diagram of a composing apparatus constructed in accordance with the present invention.

FIG. 2 is an enlarged view of a cross section of the lenticular print film illustrating the viewing angle of an individual lenticule and showing the condensed images formed beneath the lenticule.

DETAILED DESCRIPTION

Shown in FIG. 1 is a film strip 10 which contains a plurality of two-dimensional views 11a, 11b, 11c and 11d of an object field taken from spaced vantage points. Such a film strip might be produced, for example, by use of multi-lens camera of the types described in U.S. Pat. Nos. 3,895,867 and 3,953,869. While the film strip shown in FIG. 1 includes four two-dimensional views, those skilled in the art will recognize that a smaller or larger number of two-dimensional views may be used. In the FIG. 1 apparatus, there is provided a primary enlarging lens 12 by which the views 11 on the film strip 10 are projected onto an image plane 15, where they may be visualized as forming a like plurality of enlarged side-by-side views 14a – 14d. In the embodiment of FIG. 1, image plane 15 is constituted by the rear surface of a plano-convex lens 16. The configuration of the convex surface 18 of lens 16 is such as to concentrate the light from the respective enlarged images 14a – 14d towards a set of secondary enlarging lenses 20a – 20d. It will be appreciated, therefore, that the lens 16 does not actually form the images 14a – 14d, but serves to concentrate the light projected from the views 11a – 11d towards the secondary lenses. For convenience of illustration herein, however, the images 14a – 14d will be referred to as though actually formed.

The secondary enlarging lenses 20a, 20b, 20c and 20d are arranged relative to the enlarged images 14a, 14b, 14c and 14d, respectively, so as to project such images onto a lenticular print film 22 in the manner described and illustrated in the aforementioned U.S. Pat. No. 3,953,869, the pertinent portions of which are hereby incorporated into this application.

As illustrated in FIG. 2, the lenticular print film 22 comprises a lenticular screen 23 having a multiplicity of lenticules 24 formed on one surface thereof and a photosensitive layer 26 affixed to the other surface thereof. The layer 26 may be coated on the screen or separately formed and adhered thereto. It may also be provided and used as a separate sheet positioned behind the screen.

As taught in U.S. Pat. No. 3,953,869, for proper image composition or structure in the stereoscopic photograph the lens 20a – 20d and the corresponding two-dimensional images 14a – 14d should be positioned relative to each other and to the lenticular print film 22 such that the condensed images 21a – 21d (see FIG. 2) formed on the area of the photosensitive surface 26 beneath each lenticule are symmetrically spaced across the width w of the lenticule and are spaced apart by substantially W/N, where N is the number of two-dimensional views 11a – 11d. In addition, for optimum image quality the overall projection angle β of the secondary lenses 20a – 20d (FIG. 1) should substantially equal the viewing angle θ of the lenticular screen (FIG. 2). Where, in accordance with U.S. Pat. No. 3,953,869, scanning of the projected two-dimensional images is employed to match the projection angle β to the viewing angle θ, whereby the condensed images 21a – 21d from the corresponding views 11a – 11d will substantially fill the width w of the lenticule but without overlap, the overall projection angle β is the angle subtended by endmost projection lens locations with the scanning distance taken into account, i.e., the angle subtended by the lens locations 20a' and 20d as depicted in FIG. 1. One arrangement for accomplishing such scanning in the apparatus of the present invention is illustrated in FIG. 1. This arrangement corresponds to that shown in FIG. 10c of U.S. Pat. No. 3,953,869 and is described more fully in that patent. Briefly, however, the lenses 20a – 20d are supported for movement as a group transverse to the optical axis 27 of the enlarging system. The lenticular print film 22 is similarly supported for transverse movement. A lever arm 28 is coupled to the supports for the lenses 20a – 20d and the lenticular print film 22, as schematically illustrated in FIG. 1 by the lines 30 and 32, and, when actuated, moves the lenses and the film by amounts which are proportional to the respective distances of the lenses and the film from image plane 15. That is, the lenses 20a – 20d are shifted such that the righthandmost lens moves from the dashed-line position 20a' to the solid-line position 20a, and the lenticular print film moves from the dashed-line position 22' to the solid-line position 22. Scanning of the projected images may also be achieved by alternate means, which are fully disclosed in U.S. Pat. No. 3,953,869.

The purpose of the primary enlarging stage is to expand the length of the image area on the film strip 10 to the extent necessary to allow the secondary enlarging lenses 20a – 20d to be spaced apart by the proper distance d, as illustrated in FIG. 1, for forming the condensed images 21a – 21d at the proper spacing (W/N) beneath the lenticules 24. Whether or not image scanning is employed, it may be seen from FIG. 1, and as is more fully described in U.S. Pat. No. 3,953,869, the spacing d may be expressed as:

$$d = 2H \tan(\theta/2)/N \qquad (1)$$

where:

H is the distance between the plane of lenses 20a - 20d and the lenticular print film 22:

θ is the viewing angle of the lenticules; and

N is the number of two-dimensional views 11a - 11d.

The parameters of the primary and secondary enlarging stages are therefore selected so as to satisfy Equation (1). Such parameters include the overall enlarging ratio, the primary and secondary enlarging ratios, the distances h, g, H and G, the focal lengths of the primary lens 12 and the secondary lenses 20a - 20d, and the spacing l between adjacent two-dimensional views on the film strip 10. The lenticule width w and the viewing angle θ may also be varied, if desired, to meet the requirements of Equation (1). In certain situations, it might be advantageous to vary the number of two-dimensional views N. Typically, however, w, θ and N will be known parameters and the other variables of the composing apparatus will be selected to provide the spacing d required by Equation (1) for such values.

An initial determination to be made is the overall enlarging ratio. This will of course depend on the size u of the views 11a - 11d on film strip 10 and the desired size U of the stereoscopic photograph. For a snapshot, for example, a suitable overall ratio (U/u) might be on the order of 7.0/1. It will be appreciated that various combinations of primary and secondary enlarging ratios may be employed to provide the desired overall enlargement, although the major enlargement preferably will be accomplished in the primary stage. An appropriate secondary enlarging ratio might therefore be about 2.0/1.

Also, the secondary projection distance or height H will preferably be selected to be approximately equal to an expected average viewing distance of the stereoscopic photograph. Using the snapshot case again, by way of example, H might be on the order of 280 mm (approximately eleven inches), a typical viewing distance for snapshots. The spacing d may then be determined from Equation (1). Assuming there are four two-dimensional views 11a - 11d (N=4) as depicted in FIG. 1 and that θ is 20°, the spacing d for an H of 280 mm is 24.7 mm. For these conditions, the focal length of the secondary lenses might be selected at 100 mm, in which case the distance G would be 155.6 mm and the actual enlarging ratio in the secondary stage would be 1.8/1 (see Equations (16) and (17) in U.S. Pat. No. 3,953,869). The spacing D along image plane 15 between the images on adjacent enlarged images 14a - 14d of a like object, which, for convenience, may be taken as the selected object, which corresponds to the spacing d from Equation (1) may then readily be determined (see Equation (18) in U.S. Pat. No. 3,953,869). For the foregoing values of d, G and H, D is 38.4 mm. As will be apparent, D may also be calculated from l and the secondary enlarging ratio, which in the example discussed is 3.9/1. If the required primary enlarging ratio is known, as it is when the overall and secondary ratios are known, the distances g and h of the primary stage may of course be obtained by use of Equations (16) and (17) of U.S. Pat. No. 3,953,869 upon selection of the focal length for lens 12. Assuming a focal length of 100 mm, the values of g and h would be 125.6 mm and 490 mm, respectively.

As noted above, the primary lens 12 forms magnified images of the four two-dimensional views 11a - 11d on or near the field lens 16. The purpose of the lens 16 is to reimage the aperture stop of the primary enlarging lens 12 on the aperture stop of each secondary enlarging lens 20a - 20d, and it may take any configuration appropriate to that end. For example, although shown as a plano-convex lens in FIG. 1, lens 16 may instead be a double convex lens or the like. The other characteristics of the lens 16 may likewise be selected as required to fit specific applications. For example, a suitable focal length for lens 16 for the above mentioned exemplary values of g, h, G and H, etc., would be on the order of 240 mm. By redirecting the light rays back to the secondary enlarging stage in this matter, energy losses are minimized and the final image plane, i.e., the focal plane of the lenticular screen, has substantially uniform image intensity distribution. Although lens 16 is shown as a one-piece structure in FIG. 1, it may be formed in sections 16a - 16d if desired, or it may comprise several entirely separate lenses.

As described in U.S. Pat. No. 3,953,869 and as will be appreciated by those skilled in the art, the required value of d for projection of the images of the selected object in registry with the reference point varies with the distance from the camera to the selected object. Unless this is otherwise taken into account, as, for example, by use of an adjustable lens camera of the type described in U.S. Pat. No. 3,953,869, d would have to be changed everytime the distance to the selected object changed. Since the selected object, or "key subject matter", distance is likely to be almost infinitely variable from picture to picture, frequent adjustment of d would be required. The two-stage composing apparatus of the present invention, however, overcomes this problem by permitting rapid and accurate variation of the spacing D between like images on adjacent ones of enlarged images 14a - 14d.

This may readily be accomplished by varying the distances g and h, as, for example, by means of a stepping motor 34 coupled to the support frames for the film strip 10 and the lens 12, indicated schematically at 36 and 38, respectively. Thus, if the primary and secondary stages of the composing apparatus of FIG. 1 are arranged to project the images of a selected or key object at, say, 10 feet from the camera in registry with the predetermined reference point, and it is desired to produce a stereoscopic photograph having as the selected object an object located at any other distance, say 5 feet or 15 feet from the camera, the stepping motor 34 may be actuated to move the film strip 10 and the primary lens 12 in the directions and by the amounts needed to project the images of such other selected object in registry with the predetermined reference point. As will be apparent, such movement of the film strip 10 and the lens 12 will increase or decrease, as the case may be, the magnification of the primary stage by an amount sufficient to provide the spacing D between adjacent images of the selected object which is required by the particular spacing d of the secondary lenses 20a - 20d for the projection of such selected object images in alignment with the reference point at the lenticular print film 22. The two-stage composing apparatus of the invention thus permits of rapid and simplified composing of stereoscopic photographs without limitation as to selection of the object to be located in the plane of the photograph and while allowing the use of simple, fixed-lens cameras.

Although the invention has been described and illustrated herein by reference to specific embodiments thereof, it will be understood by those skilled in the art that such embodiments are susceptible of variation and modification without departing from the inventive concepts embodied therein. Accordingly, all such modifications and variations are intended to be included within the scope of the appended claims.

We claim:

1. Apparatus for composing a stereoscopic photograph from a plurality N of adjacent two-dimensional views of an object field taken from spaced vantage points relative to the field, comprising:

means for enlarging said adjacent N two-dimensional views to form a corresponding plurality N of adjacent enlarged two-dimensional images of said views; and means, including a corresponding plurality N of projecting lenses, for projecting said N enlarged two-dimensional images through a lenticular screen of lenticule width $w$ and on to a photosensitive surface positioned therebehind, with the projected image from each enlarged image of a selected object in the object field in substantial registry with a reference point, so as to form behind each lenticule of said screen a corresponding plurality N of condensed images which are spaced apart by substantially $w/N$.

2. The apparatus of claim 1 wherein the projecting means includes field lens means for imaging said N enlarged two-dimensional images on said N projecting lenses.

3. The apparatus of claim 2 wherein:

said field lens means comprises a plano-convex lens, the plane face of said lens being oriented towards said enlarging means; and said enlarging means forms said N enlarged two-dimensional images on said plane face.

4. The apparatus of claim 1 wherein the projecting means includes means for changing the angle of projection of said N enlarged two-dimensional views during the projection thereof, while maintaining the projected images of said selected object in substantial registry with said reference point, by an amount such that the overall projection angle $\beta$ of the projecting means is substantially equal to the viewing angle of the lenticules of said lenticular screen.

5. The apparatus of claim 1 wherein the distance H between said plurality N of projecting lenses and said lenticular screen substantially equals an average viewing distance for the stereoscopic photograph.

6. The apparatus of claim 1 wherein:

said plurality N of adjacent two-dimensional views are contained on a film strip in side-by-side spaced relation; and said enlarging means includes means for mounting said film strip therein for enlargement of said N two-dimensional views contained thereon.

7. The apparatus of claim 1 wherein:

said plurality N of projecting lenses are spaced apart by a distance $d$; and said enlarging means magnifies said N two-dimensional views by an amount such that the spacing D between the images of said selected object on adjacent ones of said N enlarged two-dimensional images is substantially equal to that spacing required by said spacing $d$ between adjacent projecting lens for projection of said selected object images in registry with said reference point.

8. The apparatus of claim 7 wherein said enlarging means includes means for adjusting the magnification of said N two-dimensional views to provide said required spacing D for selected objects located at different distances from said vantage points.

* * * * *